US012110055B1

(12) United States Patent
Parkila et al.

(10) Patent No.: US 12,110,055 B1
(45) Date of Patent: Oct. 8, 2024

(54) DRIVER IN THE LOOP PARALLEL PARKING ASSISTANCE SYSTEM

(71) Applicant: GM GLOBAL TECHNOLOGY OPERATIONS LLC, Detroit, MI (US)

(72) Inventors: Magdalena M Parkila, Royal Oak, MI (US); Avesta Goodarzi, Whitby (CA); Norman J Weigert, Weigert (CA); Michael J Bliss, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 18/299,263

(22) Filed: Apr. 12, 2023

(51) Int. Cl.
*B62D 15/02* (2006.01)

(52) U.S. Cl.
CPC .................. *B62D 15/028* (2013.01)

(58) Field of Classification Search
CPC .................................................. B62D 15/028
See application file for complete search history.

(56) References Cited

U.S. PATENT DOCUMENTS

| | | | | |
|---|---|---|---|---|
| 7,012,550 B2 * | 3/2006 | Iwakiri | ................ | B62D 15/027 340/932.2 |
| 7,053,795 B2 * | 5/2006 | Maemura | .................. | B60R 1/28 348/148 |
| 7,489,256 B2 * | 2/2009 | Dergounov | ............ | B60Q 1/484 340/815.45 |
| 7,599,773 B2 * | 10/2009 | Tanaka | ............... | B62D 15/0285 382/296 |
| 8,655,551 B2 * | 2/2014 | Danz | .................... | B62D 15/027 701/44 |
| 10,878,698 B2 * | 12/2020 | Cheng | .................... | G08G 1/166 |
| 10,974,764 B2 * | 4/2021 | Inoue | .................... | G08G 1/168 |

* cited by examiner

Primary Examiner — John A Tweel, Jr.
(74) Attorney, Agent, or Firm — Lorenz & Kopf LLP

(57) ABSTRACT

Method for providing parallel parking assistance including generating an augmented video stream including an overhead view video stream, a graphical representation of a host vehicle, and a first arrow for indicating an initial position of the host vehicle, generating, by a processor, a first control signal indicative of a first steering angle in response to receiving a first confirmation signal from a user interface indicative of a confirmation of the initial position of the host vehicle, generating, by the processor, a second control signal indicative of a second steering angle in response to a change in yaw reaching a first desired yaw, generating, by the processor, a second arrow to be overlaid on the overhead view video stream indicative of a distance between the host vehicle and a curb, generating, by the processor, a third control signal indicative of a third steering angle in response to receiving a second confirmation signal from the user interface indicative of a confirmation of the distance between the host vehicle and the curb.

20 Claims, 6 Drawing Sheets

600

DRIVER IN THE LOOP PARALLEL PARKING ASSISTANCE SYSTEM

INTRODUCTION

The present disclosure generally relates to a parallel parking driver assistance system in a vehicle, and more particularly relates to a method and apparatus for providing driver indicators for parallel parking assistance for vehicles not equipped with environment detecting systems.

Parallel parking remains one of the most challenging aspects of driving for many drivers. Not being able to judge a distance to a curb and other vehicles, as well as trying to align the passenger side of the vehicle with the curb and other parked cars, which may be out of view of the driver, can make it difficult for drivers to know how to angle and position their vehicle. Add to this the anxiety often experienced by drivers when lots of other traffic, pedestrians and general observers are nearby as well as the general anxiety experienced when trying to perform a difficult maneuver results in many drivers who avoid parallel parking all together.

Many new vehicles include sensors and algorithms for automated parallel parking. These additional sensors and the required computational resources add additional cost to the vehicle which may put these features out of the reach of young or low income drivers. In addition, due to the great variance and state of deterioration of curb structures, it is notoriously difficult to accurately detect a curb when using automated parallel parking systems, thereby frequently rendering these systems inoperative. It is desirable to overcome the aforementioned problems in order to provide parallel parking assistance to drivers in vehicles not equipped with extensive sensor and/or computational systems. Furthermore, other desirable features and characteristics of the present invention will become apparent from the subsequent detailed description and the appended claims, taken in conjunction with the accompanying drawings and the foregoing technical field and background.

SUMMARY

A vehicle driver parallel parking assistance system. The system is operative to calculate a vehicle motion path and to generate user prompts to assist a driver to perform a parallel parling operation.

In accordance with an aspect of the present disclosure, an apparatus including a plurality of cameras for capturing a plurality of video streams, an image processor for generating an overhead view video stream in response to the plurality of video streams, a processor configured for performing a parking assist algorithm including, generating an augmented video stream including the overhead view video stream, a graphical representation of a host vehicle, and a first arrow for indicating an initial position of the host vehicle, for generating a first control signal indicative of a first steering angle in response to receiving a first confirmation signal from a user interface indicative of a confirmation of the initial position of the host vehicle, for generating a second control signal indicative of a second steering angle in response to a change in yaw reaching a first desired yaw, generating a second arrow to be overlaid on the overhead view video stream indicative of a distance between the host vehicle and a curb, generating a third control signal indicative of a third steering angle in response to receiving a second confirmation signal from the user interface indicative of a confirmation of the distance between the host vehicle and the curb, and providing a user feedback indicative of a completion of the parking assist algorithm in response to the change in yaw reaching a second desired yaw.

In accordance with another aspect of the present disclosure, wherein the change in yaw is determined against an initial host vehicle yaw established at the initial position of the host vehicle.

In accordance with another aspect of the present disclosure, wherein the second desired yaw is zero degrees.

In accordance with another aspect of the present disclosure, wherein the first desired yaw is 45 degrees.

In accordance with another aspect of the present disclosure, further including a steering controller for adjusting a steering angle of a host vehicle steering mechanism in response to the first control signal, the second control signal and the third control signal.

In accordance with another aspect of the present disclosure, wherein the first confirmation signal is generated in response to a host vehicle driver depressing a touch sensitive display at a point where the first arrow is displayed.

In accordance with another aspect of the present disclosure, wherein a tip of the first arrow is aligned with a left rear corner of a forward parked vehicle shown on the augmented video stream.

In accordance with another aspect of the present disclosure, wherein the processor is further operative for generating a throttle control signal for controlling a reversing of the host vehicle during the parking assist algorithm.

In accordance with another aspect of the present disclosure, further configured for suspending the parking assist algorithm in response to receiving a braking indicator indicative of a host vehicle brake pedal being depressed.

In accordance with another aspect of the present disclosure, a method for performing a parking assist algorithm including generating, by an image processor, an augmented video stream including an overhead view video stream, a graphical representation of a host vehicle, and a first arrow for indicating an initial position of the host vehicle, generating, by a processor, a first control signal indicative of a first steering angle in response to receiving a first confirmation signal from a user interface indicative of a confirmation of the initial position of the host vehicle, generating, by the processor, a second control signal indicative of a second steering angle in response to a change in yaw reaching a first desired yaw, generating, by the processor, a second arrow to be overlaid on the overhead view video stream indicative of a distance between the host vehicle and a curb, generating, by the processor, a third control signal indicative of a third steering angle in response to receiving a second confirmation signal from the user interface indicative of a confirmation of the distance between the host vehicle and the curb, and providing, by the processor, a user feedback indicative of a completion of the parking assist algorithm in response to the change in yaw reaching a second desired yaw.

In accordance with another aspect of the present disclosure, wherein the overhead view video stream is generated in response to a compilation of a plurality of video streams received from a plurality of vehicle cameras having overlapping fields of views.

In accordance with another aspect of the present disclosure, further including controlling a steering controller for adjusting a host vehicle steering angle in response to the first control signal, the second control signal, and the third control signal.

In accordance with another aspect of the present disclosure, wherein the second desired yaw is equal to an initial yaw determined at the initial position of the host vehicle.

In accordance with another aspect of the present disclosure, wherein the processor is further configured for generating a throttle control signal for controlling a reversing maneuver of the host vehicle during performance of the parking assist algorithm.

In accordance with another aspect of the present disclosure, wherein the processor is further configured for suspending the parking assist algorithm in response to receiving a braking indicator indicative of a host vehicle brake pedal being depressed.

In accordance with another aspect of the present disclosure, wherein the first confirmation signal is generated in response to a host vehicle driver depressing a touch sensitive display at a point where the first arrow is displayed.

In accordance with another aspect of the present disclosure, wherein the second confirmation signal is generated in response to a host vehicle driver depressing a touch sensitive display at a location where the second arrow is displayed.

In accordance with another aspect of the present disclosure, wherein the processor is further configured for generating a user steering prompt indicative of a steering angle in response to the first control signal, the second control signal and the third control signal.

In accordance with another aspect of the present disclosure, a vehicle control system including a vehicle camera system for generating an overhead view video of a host vehicle environment, an image processor for generating an augmented image including the overhead view video, a graphical representation of a host vehicle, a first arrow and a second arrow, a display for displaying the augmented image, a user input for generating a first user confirmation signal in response to a first user input and a second user confirmation signal in response to a second user input, a processor for coupling a request to display the first arrow to the image processor indicative of an initial position of the host vehicle, generating a first control signal indicative of a first steering angle in response to receiving a first confirmation signal from a user interface indicative of a confirmation of the initial position of the host vehicle, generating, by the processor, a second control signal indicative of a second steering angle in response to a change in yaw reaching a first desired yaw, coupling a request to display the second arrow to the image processor indicative of a distance between the host vehicle and a curb, generating, by the processor, a third control signal indicative of a third steering angle in response to receiving a second confirmation signal from the user interface indicative of a confirmation of the distance between the host vehicle and the curb, and providing, by the processor, a user feedback indicative of a completion of the parking assist algorithm in response to the change in yaw reaching a second desired yaw.

In accordance with another aspect of the present disclosure, wherein the user feedback is overlaid on the overhead view video displayed on the display.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Manual parallel parking is difficult for many drivers. Existing fully automatic park assist systems are only available in expensive cars since they need almost 360-degree sensing including front, rear and side directions. The proposed system is a low-cost park aid system with no need for surround sensing. The driver is presented with a birds eye view including added arrow icons to provide position feedback through touch inputs. The exemplary system provides cues to the driver and the driver indicates the vehicle positioning when the vehicle has been positioned according to those cues. The driver can indicate the vehicle initial position with respect to a parked vehicle before starting the parallel parking maneuvers and can later indicate a vehicle intermediate position comparing to the curb. Having the vehicle position feedback in the two above mentioned points, a vehicle control system may automatically control steering angle automatically while driver controls throttle and brake operation. In some exemplary embodiments, the throttle and/or brake may be controlled automatically by the system if the vehicle is so equipped and/or these features are activated by the driver. The system provides identical performance in different parallel parking scenarios against different parked vehicles with different sizes.

Figure 1:
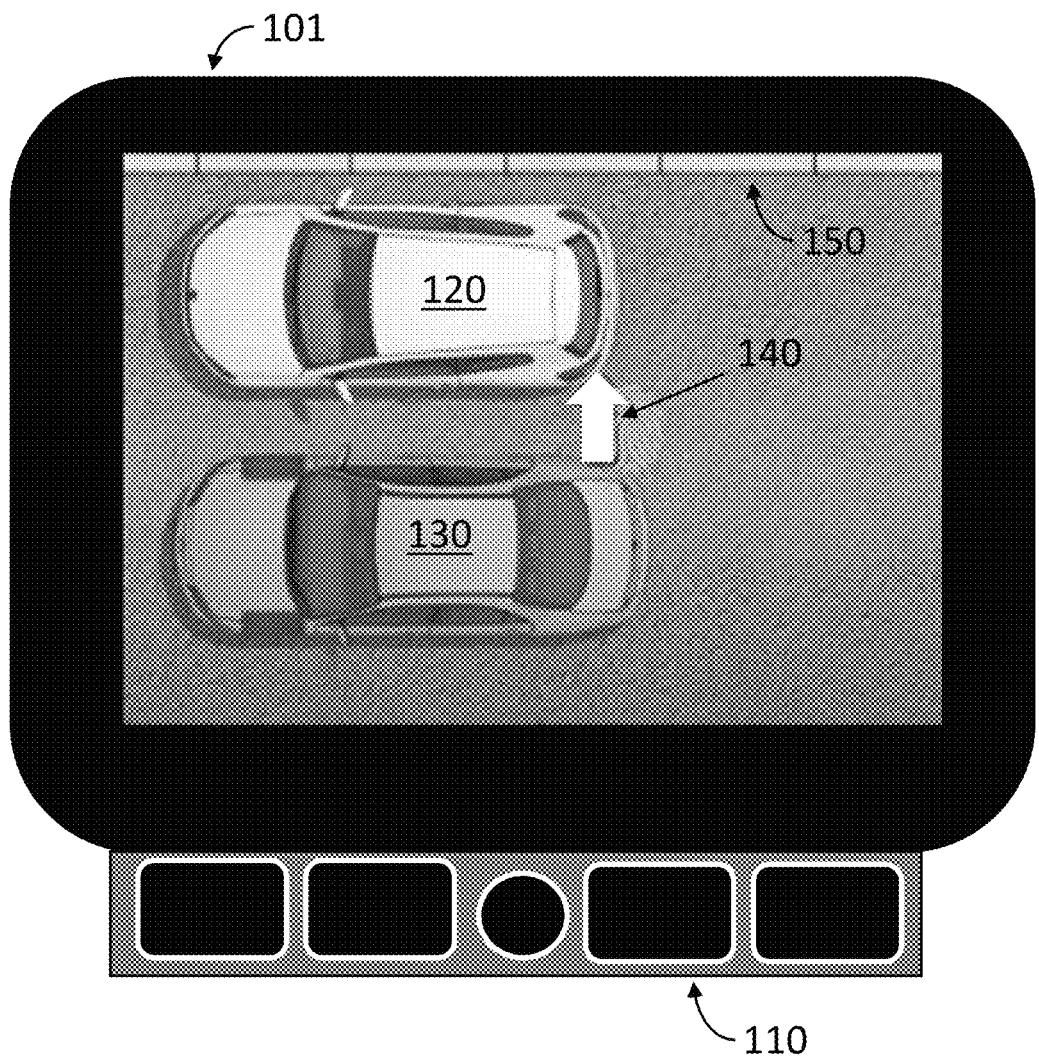
FIG. 1 shows an exemplary human machine interface for providing low resource parallel parking assistance in accordance with various embodiments.

Turning now to FIG. 1, an exemplary human machine interface (HMI) for providing low resource parallel parking assistance is shown in accordance with various embodiments. The exemplary HMI 100 shows a display 101 with a button panel 110. The button panel can include buttons, knobs, and other user input controls. Depending on vehicle features, the driver may control steering, brake and throttle or one or more of these operations may be controlled automatically in response to driver inputs.

The HMI 100 is configured to enable the low-cost, low resource, parallel park aid system with no need for active surround sensing. The system utilizes the birds eye view surround vision feature such that the HMI 100 displays the birds eye view on a vehicle touch screen display 101, such as a center stack display or the like. The system is configured to generate arrow icons with specified lengths and locations, and uses a drivers touch input as vehicle position feedbacks. In some exemplary embodiments, automatic control of steering angle can be enabled during a parallel parking maneuver based on available vehicle data and customer's touch inputs feedback. In some exemplary embodiments, manual throttle and brake controls can be performed by the driver. When equipped with appropriate systems, a vehicle controller may control one or more of the steering, braking and throttle control. The system is configured to perform an algorithm for calculating arrow icons lengths and locations for the host vehicle based on known vehicle dimensions and steering angle characteristics.

In some exemplary embodiments, the HMI 100 includes a vehicle touch screen display 101 for displaying an overhead view, or birds eye view, image. The birds eye view image can be generated in response to a plurality of video streams generated by a plurality of cameras having fields of views (FOV) outside of the vehicle. An image processor, or the like, is next operative to receive this plurality of video streams and stitch then them together to generate the birds eye view. In the exemplary birds eye view shown on the touch screen display, the host vehicle 130, a parked vehicle 120 and the curb 150 are shown. In addition, in response to a vehicle occupant enabling the parallel parking assist feature, an arrow 140 is generated by a processor and is overlaid on the birds eye view image. In some exemplary embodiments, the arrow 140 may be replaced by any other type of appropriate graphical element, such as a line, bracket, circle, rectangle, highlight, etc. This arrow 140 has a specific length and is positioned at a specific position relative to the host vehicle 130. In response to enabling the parking assist feature, the driver would position the host vehicle 130 alongside the parked vehicle 120 such that the tip of the arrow 140 is positioned at the rear edge of the parked vehicle 120. The driver would then provide a feedback to the parking assist feature when the host vehicle 130 is correctly positioned. In some exemplary embodiments, this feedback can include pressing on the arrow 140 for a touch sensitive display or pressing a button on the button panel 110 or any other configured user input.

Figure 2:
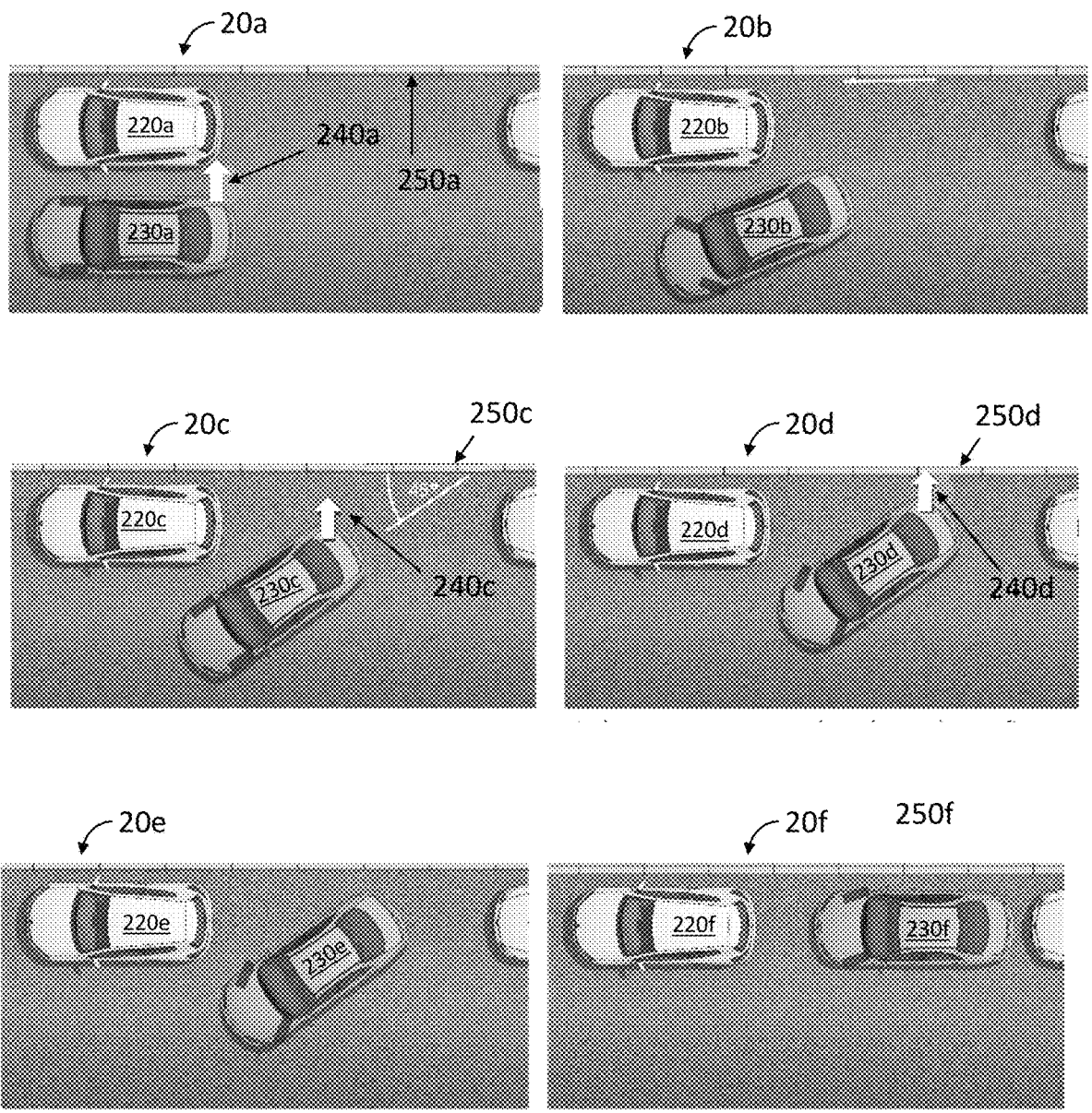
FIG. 2 shows a plurality of exemplary parallel parking display states to be displayed to a vehicle driver when providing the parallel parking assistance in response to a parallel parking assistance algorithm according to an exemplary embodiment.

Turning now to FIG. 2, a plurality of exemplary parallel parking display states 200 are shown that can be displayed to a vehicle driver when providing the parallel parking assistance in response to a parallel parking assistance algorithm according to an exemplary embodiment.

The exemplary parking display states 20a, 20b, 20c, 20d, 20e, 20f are presented to a driver on a vehicle display, such as a center stack touch screen display, or the like. The parking display states 20a, 20b, 20c, 20d, 20e, 20f are generated in response to a parallel parking assist algorithm performed by a vehicle processor or the like. The driver can control various vehicle systems, such as throttle, steering and brake in response to one or more user prompts generated by the parking assist algorithm and displayed on the vehicle display. In some exemplary embodiments, a vehicle controller may control one or more of the various vehicle systems, such as throttle, brake or steering in response to the parallel parking assistance algorithm, available vehicle capabilities and/or user and system configuration options.

The first state 20a shows an exemplary initial display that can be presented to the driver after activation of the parallel parking assistance algorithm. The first state 20a shows a host vehicle 230a, a parked vehicle 220a and a curb 250a from a birds eye view perspective. The birds eye view perspective is generated in response to a plurality of images received from a plurality of cameras positioned around the outside of the host vehicle 230a having overlapping FOVs. Since the parked vehicle 220a and the curb 250a are detected in the images from the pluralities of cameras, they are displayed at positions relative to the host vehicle 230a. Without further image processing or other sensor data, the vehicle system processor may not be aware of the location of the parked vehicle 220a and the curb 250a. Typically, a graphic representation of the host vehicle 230a is overlaid on the display at a size and position representative of the actual location and size of the host vehicle 230a.

In response to an initiation of the parallel parking assistance algorithm, an arrow 240a is generated by the parallel parking assistance processor and is overlaid on the display at a position relative to the position of the host vehicle 240a. In response to the display of the arrow 240a, the driver is expected to position the host vehicle such that the tip of the arrow aligns with the rear edge of the parked vehicle 220a. The length of the arrow 240a can be indicative of a preferred distance that would result in an efficient parallel parking operation. The length of the arrow is not based on to the driver preferences. The length and the location of the arrow can be fixed for a given vehicle and optimized off-line based to ensure the vehicle will not hit to the park vehicle later during the maneuver and that the maneuver is completed in the minimum space, longitudinally and laterally, with respect to the curb and the parked vehicle. In some exemplary embodiments, the length of the arrow 240a is indicative of a 58 centimeter distance from the host vehicle, while this value may differ for different vehicles and under different conditions. It is desirable for a driver to position the tip of the arrow 240a to be touching the right rear corner of the parked vehicle 220a on the display. After the driver positions the host vehicle 230a, by either driving forward or in reverse until the overlaid arrow 240a is even with the back of the forward parked vehicle, the vehicle position is then confirmed by the driver touching the arrow 240a or other confirmation button on the HMI. In some exemplary embodiments, the arrow length may be generated in response to a user input indicative of the rear corner of the parked vehicle. This arrow length can then be used in computing the angles and positions in the next steps in the algorithm.

In the second state 20b, the arrow 240a disappears in response to the prior driver confirmation and the vehicle starts to move rearward. At this point, the driver can be instructed to turn the steering wheel to an optimized steering angle to perform the first turn. In some exemplary embodiments, this optimized steering angle can be the vehicle maximum steering angle. An indication of the steering angle and/or an indication of achieving the optimized steering angle can be displayed on to the driver on the HMI. In some exemplary embodiments, a vehicle controller can actuate the steering controller to change the steering angle to the optimized steering angle such that the rear of the host vehicle is angled into the open parking spot as the host vehicle 230b reverses. In some exemplary embodiments, the driver may turn the steering wheel while the host vehicle 230b reverses and feedback can be provided to the driver. The driver continues driving rearward until the host vehicle 230b is positioned at the optimized angle. In some exemplary embodiments, 45 degrees is an optimized angle. The difference between the current vehicle angle and the optimized angle is estimated by tracking vehicle kinematics variables using known vehicle dimensions to estimate a change in yaw of the host vehicle. In some exemplary embodiments, the vehicle yaw angle can be estimated based on the measured vehicle yaw rate. The vehicle yaw angle can be estimated in response to measured vehicle yaw rate and vehicle dimensions. instructed to turn the steering wheel to an optimized steering angle to perform the first turn. In some exemplary embodiments, this optimized steering angle can be the vehicle maximum steering angle. An indication of the steering angle and/or an indication of achieving the optimized steering angle can be displayed on to the driver on the HMI. In some exemplary embodiments, a vehicle controller can actuate the steering controller to change the steering angle to the optimized steering angle such that the rear of the host vehicle is angled into the open parking spot as the host vehicle 230b reverses. In some exemplary embodiments, the driver may turn the steering wheel while the host vehicle 230b reverses and feedback can be provided to the driver. The driver continues driving rearward until the host vehicle 230b is positioned at the optimized angle. In some exemplary embodiments, 45 degrees is an optimized angle. The difference between the current vehicle angle and the optimized angle is estimated by tracking vehicle kinematics variables using known vehicle dimensions to estimate a change in yaw of the host vehicle. In some exemplary embodiments, the vehicle yaw angle can estimated based on the measured vehicle yaw rate. The vehicle yaw angle can be estimated in response to measured vehicle yaw rate and vehicle dimensions.

Once the host vehicle 230b reaches the optimal reversing angle, the third state 20c is displayed. The third state 20c displays an arrow 240c positioned at a right rear corner of the host vehicle 230c and extended towards the curb 250c. The arrow 240c is displayed perpendicular to the curb. The length of the arrow 240c is indicative of an optimized distance for initiating a third turn of the host vehicle 230c for executing the efficient parallel parking operation. In some exemplary embodiments, the length of the arrow 240c is indicative of a 108 centimeter distance from the body of the host vehicle. In response to reaching the third state 20c, the steering is straightened such that the host vehicle 230c reverses along an optimal reversing angle path.

The driver continues to reverse along the optimal reversing angle path until the tip of the arrow 240d reaches the curb 250d on the display, indicated on the fourth state 20d. When the new arrow touches the curb, 250d the distance to the curb 240d is confirmed by the driver by touching the arrow 240d on the HMI. Once the driver confirms the distance to the curb 250d by touching the arrow 240d or actuating an alternate user input, the fifth state 20e is displayed.

When the fifth state 20e is displayed, the arrow 240d will disappear and the steering wheel will turn counter clockwise to the calculated known angle such that the host vehicle 230e begins reversing to the left. In some exemplary embodiments, the driver will turn the steering wheel until the calculated known angle is reached. In other exemplary embodiments, a steering controller will autonomously control the steering such that the known angle is reached. The host vehicle 230e is then reversed until the host vehicle 230 is parallel with the curb 250e. Once the host vehicle 230e is parallel with the curb, the sixth stage 20f is displayed and the host vehicle steering is straightened back to the center position, allowing the driver to advance or reverse such that the host vehicle 230f is centered between the parked vehicles 220f. At this point, no further guidance/automation is required.

Figure 3:
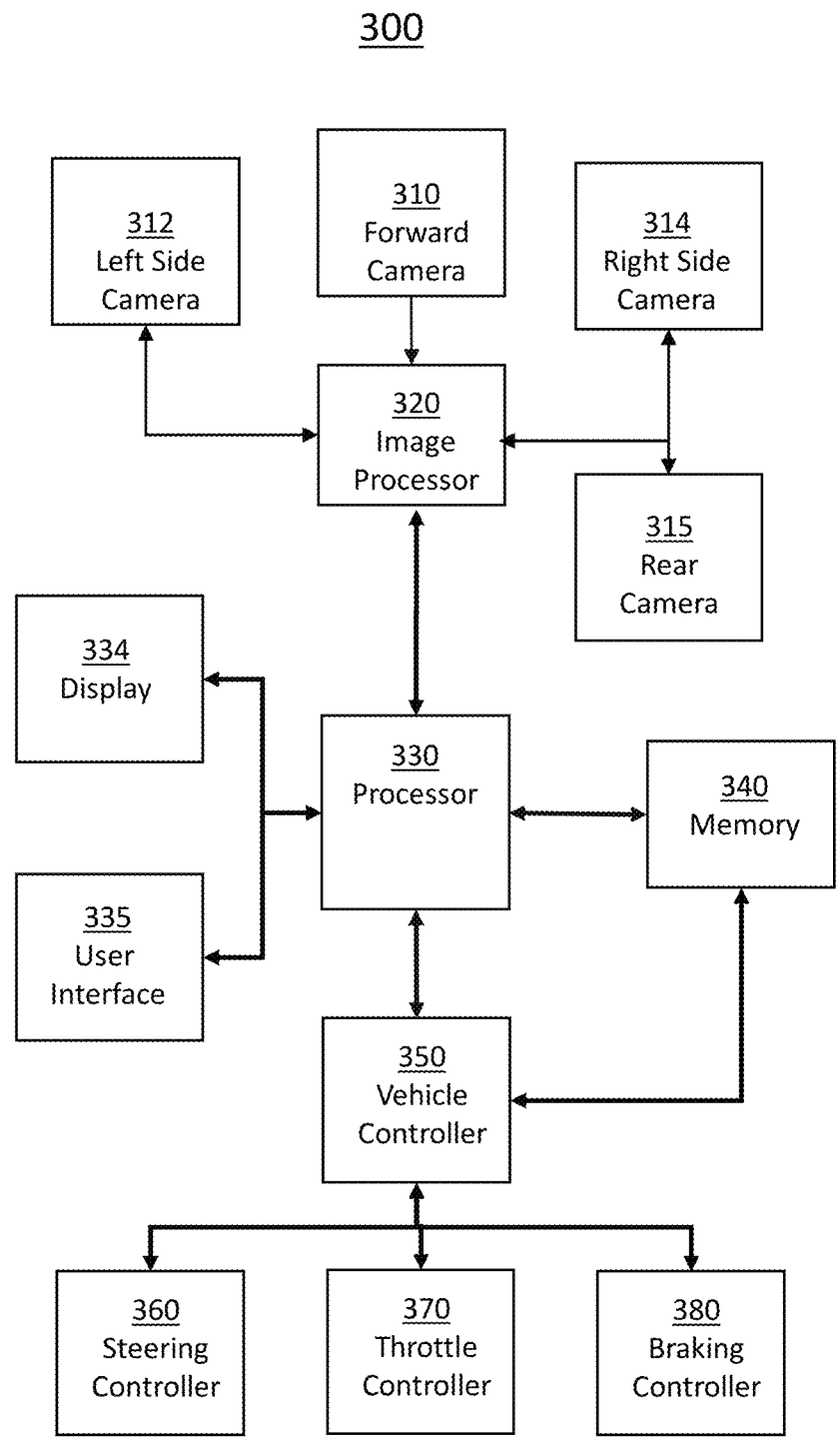
FIG. 3 shows an exemplary system for providing low resource parallel parking assistance in accordance with various embodiments.

Turning now to FIG. 3 an exemplary system 300 for providing low resource parallel parking assistance is shown in accordance with various embodiments. The exemplary system 300 includes a forward camera 310, a left side camera 312, a right side camera 314, a rear view camera 315, an image processor 320, a processor 330, a display 334, a user input 335, a memory 340, a vehicle controller 350, a steering controller 360, a throttle controller 370, and a braking controller 380.

The exemplary system 300 is first operative to initiate the parallel parking assistance algorithm in response to a user input received at the user interface 335 indicative of a driver request to initiate the algorithm. In response to initiation of the algorithm, each of the left side camera 312, right side camera 314, forward camera 310 and rear camera 315 are configured to each capture at least one image. These images are coupled to the image processor 320 which is configured to generate a birds eye view image by warping each of the received images to imitate a top view perspective and then stitching the warped images together to generate a complete top view image of an area around the host vehicle.

The processor 320 can couple the birds eye view image to the display 334 for presentation to the driver. In some exemplary embodiments, the processor 320 can generate a graphical representation of the host vehicle and overlay this graphical representation over the birds eye view image. The graphical representation of the host vehicle can be representative of a position and size of the host vehicle within the birds eye view image. In some exemplary embodiments, the graphical representation of the host vehicle can be generated in response to an image file stored in the memory 340. This process can be continuously repeated such that a plurality of sequential birds eye view images are generated and coupled to the display such that a stream of images are presented to the driver on the display 334, such as an in cabin display, center stack display, electronic instrument cluster display, or the like.

In performing the parallel parking assistance algorithm, the processor 330 can be configured to generate a first arrow to overlay on the birds eye image displayed on the display 334, wherein the first arrow is indicative of a required host vehicle initial position for the parallel parking maneuver. The first arrow can extend from the graphical representation of the host vehicle and has a length representative of an optimal distance between the host vehicle and a forward parked vehicle. The driver is expected to maneuver the host vehicle such that the tip of the first arrow aligns with a left rear corner of the forward parked vehicle. In response to driver inputs, the host vehicle can control the steering angle using the steering controller 360, the throttle level using the throttle controller 370 and the brake application force using the braking controller 380. While the indicator on the bird's eye display is described as an arrow, any suitable graphical element, such as a line, shape or highlight, can be used to indicate the alignment of the host vehicle to the forward parked vehicle and/or distance between the host vehicle and the forward parked vehicle.

Once the driver has maneuvered the host vehicle such that the tip of the first arrow is positioned at the left rear corner of the forward parked vehicle, the driver provides an indication of the correct initial position of the vehicle. For example, the driver may press the touch sensitive display at a location over the display of the first arrow.

In response to the confirmation of the initial host vehicle position by the driver, the processor 330 may calculate a steering angle for performing the first turn of the parallel parking maneuver. In some exemplary embodiments, the first turn maneuver can transition the centerline of the host vehicle from parallel to the curb to 45 degrees from the curb. The processor 330 can generate a control signal indicative of the steering angle and couple this control signal to the vehicle processor 350. In turn, the vehicle processor 350 may generate a steering control signal to couple to the steering controller 360 for controlling the steering mechanism to turn the host vehicle front wheels to the desired steering angle. In other exemplary embodiments, the processor 330 can generate a prompt to provide to the driver to turn the steering wheel to place the steering mechanism at the desired steering angle. The processor 330 may provide feedback to the driver once the desired steering angle has been reached.

Once the host vehicle steering mechanism has been turned to the desired steering angle, the processor can generate a prompt to the driver to begin reversing the host vehicle while the steering mechanism is at the desired steering angle. The processor determines a change in host vehicle yaw from an initial position host vehicle yaw. Once the host vehicle yaw reaches a desired yaw, the processor generates a second control signal to couple to the vehicle controller 350 to straighten the steering mechanism in order to return the steering angle to zero degrees. Alternatively, the processor 330 can generate a prompt to display to the driver to return the steering mechanism steering angle to zero degrees.

In response to the steering angle being set to zero degrees and the centerline of the host vehicle being parallel to a desired yaw angle, the processor 330 can then generate a second arrow for overlaying on the birds eye view displayed on the display 334. The second arrow is indicative of a distance between the right rear of the host vehicle and the curb. The second arrow can be presented perpendicular to the curb and originating from the right rear corner of the host vehicle. In some exemplary embodiments, the driver controls the throttle and braking of the host vehicle to reverse along a path parallel to the desired yaw angle with zero degrees of steering angle. Once the tip of the second arrow touches curb displayed on the display 334, the driver provides a user input to confirm the desired distance being reached. The user input can be received via the user interface 335 which may include a touch screen display, a knob, a button, or the like.

Once the processor 330 receives the confirmation from the user interface 335 indicative of the host vehicle reaching the desired distance, the processor generates a steering control signal to set the steering angle to a desired third steering angle. In some exemplary embodiments, the desired third steering angle has the same magnitude as the first steering angle, but in the opposite direction. Thus, if the first steering angle was 40 degrees, the third steering angle can be −40 degrees. Once the steering angle is set to the desired third steering angle, the driver is further operative to reverse the vehicle. The processor is configured to monitor the overall change in the host vehicle yaw until the initial yaw is reached. In some exemplary embodiments, the initial yaw is zero degrees and the final yaw is zero degrees. Once the final yaw is reached, the processor 330 generates a steering control signal to return the steering mechanism to a steering angle of zero degrees. At this point, the centerline of the host vehicle should be parallel to the curb. The processor then discontinues the parallel parking assistance algorithm. The birds eye view including the graphical representation of the host vehicle may still be presented on the display 334 to allow the driver to position the host vehicle between a forward parked car and a rearward parked car.

In some exemplary embodiments, the vehicle controller 350 may control the vehicle steering, throttle, and braking in response to control signals from the processor 330 if the host vehicle is suitably equipped. In these embodiments, the driver would indicate when the first arrow is shown touching the left rear corner of the forward parked vehicle to indicate an initial host vehicle position. The processor 330 would then generate control signals to rotate the steering to a first desired steering angle, to reverse the host vehicle until the host vehicle yaw reaches a desired yaw, such as 45 degrees from the initial host vehicle yaw. The processor 330 would then generate an additional control signal to return the steering mechanism to a zero steering angle. Once the zero steering angle is confirmed by the steering controller 360 or vehicle controller 350, the processor generates additional control signals to couple to the vehicle controller 350 to control the throttle controller 370 and braking controller 380 until a desired distance to the curb, as indicated by a second arrow overlaid on the birds eye view on the display 334 is confirmed by the driver. Once the desired distance is confirmed, the processor 330 may further generate a control signal to set the steering angle to a third steering angle and to generate control signals to control the throttle and braking to reverse the host vehicle at the third steering angle. Once a final desired yaw rate is detected by the processor 330, the algorithm is stopped. At this point, the host vehicle should have successfully completed the parallel parking maneuver and should be positioned between a forward parked vehicle and a rearward parked vehicle. In some of these exemplary embodiments where the processor 330 controls the steering, throttle and braking, the driver can interrupt the parallel parking maneuver by pressing the brake pedal or the like. Pressing the brake pedal can have the effect of pausing the algorithm and immediately stopping the vehicle and the parallel parking maneuver.

Figure 4:
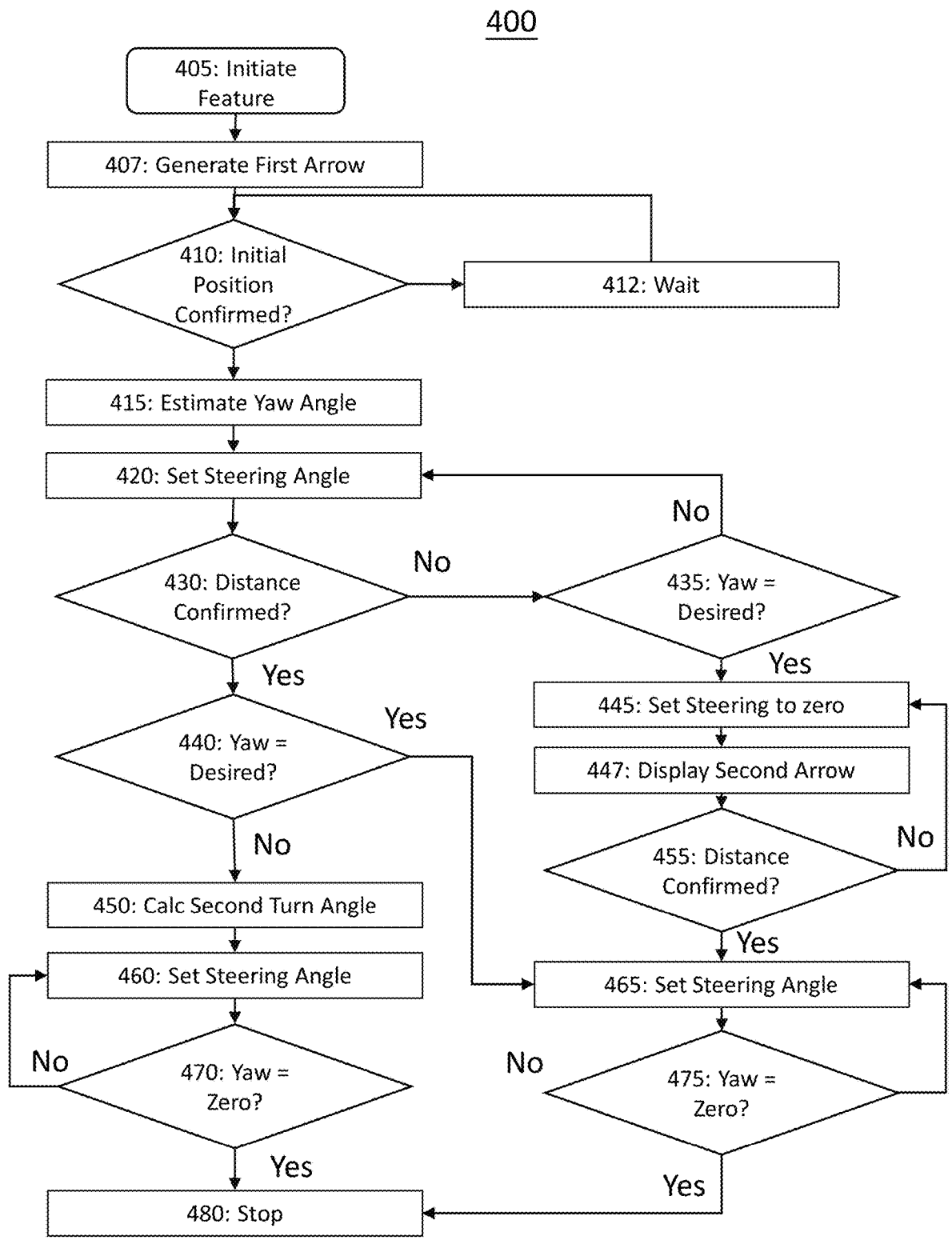
FIG. 4 shows a flowchart illustrating a method for providing low resource parallel parking assistance in accordance with various embodiments.

Turning now to FIG. 4, a flow chart illustrating an exemplary implementation of a method 400 for providing low resource parallel parking assistance is shown in accordance with various embodiments. While the following method is described as a series of sequential steps, some of the steps may be performed in parallel or non-sequentially, such as capture and processing of the image data, generation of the birds eye view image, and the like. The parallel parking assistance algorithm is first initiated 405 in response to a driver initiating the feature. The driver can initiate the feature in response to finding an open parking spot that requires a parallel parking maneuver to enter.

In response to initiation 405 of the feature, the method is next operative to generate 407 a graphical representation of a first arrow indicating an initial position of the host vehicle relative to a forward parked vehicle. In some exemplary embodiments, the first arrow is overlaid on a birds eye view image on an in-cabin vehicle display. The birds eye view image can be generated in response to multiple images received from multiple vehicle cameras having overlapping fields of view. The multiple images may then be stitched together and warped to reduce distortion. The tip of the first arrow is indicative of a desired location of a rear of a parked vehicle at which the host vehicle can perform an efficient parallel parking maneuver. In response to the display of the first arrow, the driver is expected to position the host vehicle such that the tip of the first arrow touches the rear left corner of the parked car on the birds eye view image presented on the in cabin display.

Once the driver positions the host vehicle such that the first arrow is aligned with the left rear of the parked car, the driver provides a user input confirming the correct positioning of the host vehicle. This user input can include pressing a touch sensitive display at a point of display of the first arrow, pushing an appropriate soft key displayed on the touch sensitive display or another user input, such as a button located on the host vehicle steering wheel or a button or the like located proximate to the display or on a center console or the like. The method is configured to monitor 410 for the user input indicative of the confirmation of the host vehicle being positioned in the initial position. If no confirmation is received from the driver, the method is operative to wait 412 for the confirmation.

If a confirmation is received from the driver indicative of the host vehicle being positioned in the initial position, the method is next operative to continuously estimate 415 a change in yaw angle of the host vehicle. The change in yaw angle can be determined in response to a comparison of an initial yaw angle, such as zero degrees, to a current change in yaw angle. The method is next operative to set 420 a vehicle yaw angle. The vehicle yaw angle is calculated in response to known vehicle dimensions and an optimal parallel parking vehicle path. In some exemplary embodiments, the vehicle yaw angle can be to 45 degrees, but is not limited to 45 degrees. In some exemplary embodiments, a vehicle controller may automatically control the steering of the vehicle to set the steering angle to a maximum steering angle, but is not limited to a maximum steering angle, such as 40 degrees. In other exemplary embodiments, an indicator and/or instruction may be provided to the driver to instruct the driver to turn the steering wheel to the maximum steering angle. When the steering angle reaches the maximum steering angle, a second indicator can be provided to the driver to stop turning the steering wheel.

Once the vehicle controller detects desired yaw angle has been reached such that the host vehicle is aligned with the optimal parallel parking vehicle path, the method is next operative to detect if curb distance has been confirmed by the driver. The curb distance is represented as a second arrow overlaid on the birds eye view displayed on the in cabin display positioned from the right rear of the host vehicle perpendicular to the curb. The angle between the second arrow and the curb is typically 90 degrees. In some exemplary embodiments, the arrow may be positioned at an angle equal to a difference between the current yaw value and the desired yaw angle. Thus, if the host vehicle is positioned parallel to the curb, the arrow would be positioned 90 degrees from the centerline of the host vehicle. If the current way value is 45 degrees, the arrow would be positioned 45 degrees from the centerline of the host vehicle perpendicular to the curb. The length of the second arrow is indicative of a required optimal distance from the right rear corner of the host vehicle and the curb which grantees the desired distance to curb when the vehicle becomes parallel to the curb. While reversing the vehicle, the driver monitors the displayed distance between the tip of the second arrow and the displayed curb. Once the tip of the second arrow touches the displayed curb, the driver can confirm 430 the distance by touching the location of the arrow on the touch sensitive display or actuating an alternative user interface indicative of the distance being confirmed.

If the distance indicated by the second arrow is not confirmed 430 by the driver, the method is next configured to determine 435 if the current host vehicle yaw angle is equal to the desired yaw angle. The current host vehicle yaw angle may be determined in response to a change in the yaw angle from the initial yaw angle detected at the initial position confirmation. In some exemplary embodiments, the initial yaw angle may be a baseline yaw angle of zero degrees. As the vehicle moves backwards, while the steering is positioned at the desired steering angle, the yaw angle of the host vehicle changes. If the desired yaw angle has not been reached 435, the method returns to setting 420 the desired steering angle and determining 430 if the distance has been confirmed by the driver. For example, in case of parallel parking against narrow vehicles, such as motorcycles, before the vehicle reaches to the optimal yaw angle, such as 45 degrees, the second arrow touches the curb. Then the first turn is stopped before reaching to 45 degrees yaw and with no need for straight backup, the second turn starts with a smaller steering angle, less than maximum steering angle.

If the desired yaw angle has been reached 435, the steering angle is next set to zero degrees. Reaching the desired yaw angle is indicative of the host vehicle having completed the first turn of the parallel parking maneuver. The rear of the host vehicle should be pointing into the parking spot with the centerline of the vehicle being at the desired yaw angle. In some exemplary embodiments, the steering angle can be set to zero automatically by an vehicle control system, such as a vehicle controller or a steering controller. Alternatively, a prompt may be provided to the driver to straighten the steering angle. In these embodiments, a prompt may be provided to the driver indicative of the steering angle and/or a successful completion of the change in steering angle.

In response to the host vehicle steering being returned to zero, the method is next configured to display a second arrow having a length on the display corresponding to a desired distance between the right rear corner of the host vehicle and the curb. Then this distance is reached, the second turn of the parallel parking maneuver should be executed. In response to displaying the second arrow on the in cabin display, the method then waits for a distance confirmation from the driver. During this time, the vehicle will be moving backwards along a path at the desired yaw angle. Once the tip of the second arrow touches the curb on the display, the desired distance has been reached. The driver would then execute a user input, such as touching a location of the second arrow on the touch sensitive display or executing another suitable user input, to confirm that the desired distance has been reached. If no confirmation is received 455, the method returns to setting 445 the steering angle to zero and displaying the second arrow 447.

In response to receiving the user confirmation 455 that the tip of the second arrow has reached the curb on the display indicating that the desired distance has been reached, the method next sets the steering angle 465 to a desired steering angle to execute the second turn of the parallel parking maneuver. The second turn of the parallel parking maneuver results in the host vehicle centerline transitioning from the desired yaw angle to an angle parallel to the curb and parallel to the initial yaw angle, which can be nominally zero degrees. In some exemplary embodiments, the steering angle is set to an angle having the same magnitude as the first steering angle, but in the opposite direction. Normally the maximum available steering angle as described above, is used for parallel parking against narrow vehicles, and where the second turn steering angle is less than the maximum turn angle.

In response to the host vehicle steering being set to the desired steering angle, the method is operative to monitor 475 the yaw angle of the host vehicle. If the yaw angle has not reached zero degrees, indicative of the host vehicle centerline being parallel to the curb, the method returns to setting the steering angle to the desired steering angle. If the yaw angle has reached zero degrees 475, the method completes 480 the parallel parking assistance algorithm. In some exemplary embodiments, the method can provide an indication to the driver of the completion of the algorithm, such as a visual or aural indicator. In some exemplary embodiments, the display can continue to display the birds eye view of the host vehicle, such that the driver can see the position of the host vehicle between a forward parked vehicle and a rearward parked vehicle. In some exemplary embodiments, the driver may adjust the position of the vehicle along a path parallel to the curb in order to center the vehicle between the forward parked vehicle and the rearward parked vehicle.

In the instance where the first steering angle is set 420 and the distance between the right rear corner of the vehicle and the curb is confirmed 430 by a driver input, the method is next operative to determine 440 if the desired yaw angle has been achieved. If the desired yaw angle has been achieved, the steering angle 465 is set to zero and the method monitors 475 the yaw angle until the yaw angle reaches zero degrees. If the desired yaw angle has not been achieved 440 when the distance is confirmed 430, the method next calculates 450 a second turn angle in response to the current yaw angle and the distance between the host vehicle right rear corner and the curb. In some exemplary embodiments, the second turn angle can be equal in magnitude but opposite in direction to the first turn angle. The method is next operative to set the steering angle to the second turn angle. The method next monitors 470 the host vehicle yaw angle until the host vehicle yaw angle reaches zero. If the host vehicle yaw angle is not zero, the method returns to setting 460 the steering angle to the calculated second turn angle. If the host vehicle yaw angle is determined 470 to be zero degrees, the method completes 480 the parallel parking assistance algorithm. In some exemplary embodiments, the method can provide an indication to the driver of the completion of the algorithm, such as a visual or aural indicator. In some exemplary embodiments, the display can continue to display the birds eye view of the host vehicle, such that the driver can see the position of the host vehicle between a forward parked vehicle and a rearward parked vehicle. The driver may then adjust the position of the vehicle along a path parallel to the curb in order to center the vehicle between the forward parked vehicle and the rearward parked vehicle.

Figure 5A:
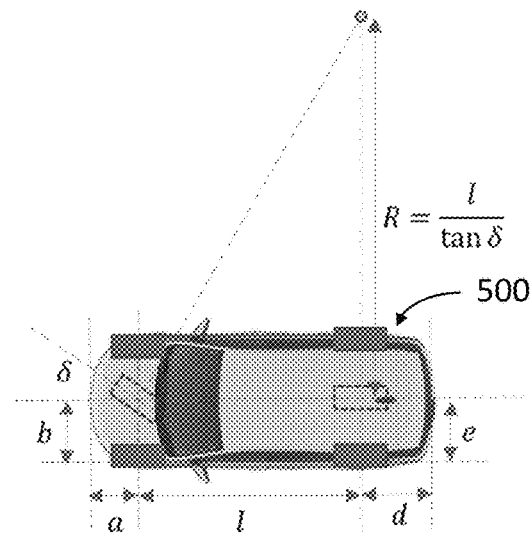
FIG. 5a is indicative of various vehicle dimensions used for calculating arrow length and steering angles for the driver in the loop parallel parking system in accordance with various embodiments.

FIG. 5a is indicative of various vehicle dimensions used for calculating arrow length and steering angles for the driver in the loop parallel parking system, wherein the turning radius (R) is determined in response to the steering angle ($\delta$). Various vehicle dimensions include the distance from the vehicle centerline to the edge of the vehicle (e), the distance from the center of the rear wheel to the back edge of the vehicle (d), the wheel base (l), the distance between the center of the front wheel and the front edge of the vehicle (a) and the distance from the vehicle centerline to the outer edge of the vehicle front wheel (b). The turning radius (R) is calculated according to the following equation.

$$R = \frac{1}{\tan\delta}$$

Figure 5B:
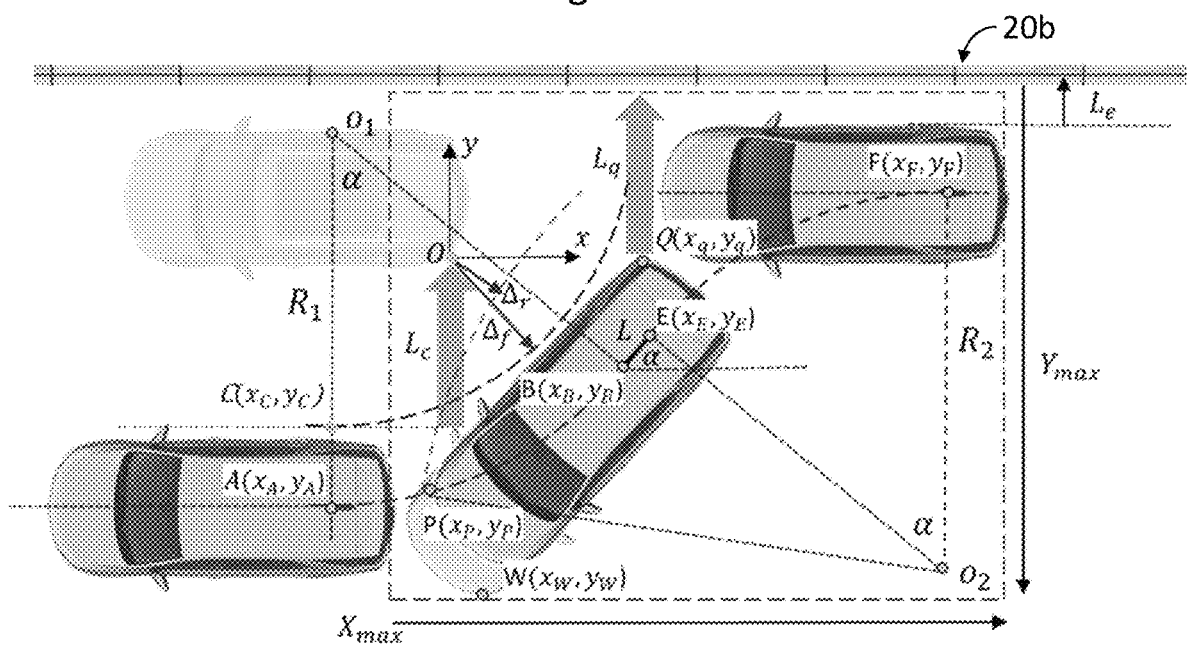
FIG. 5b illustrates a vehicle dynamics model for calculating arrow length and steering angles for the driver in the loop parallel parking system in accordance with various embodiments.

FIG. 5b, shows a vehicle dynamics model for calculating arrow length and steering angles for the driver in the loop parallel parking system is shown according to an exemplary embodiment. In some exemplary embodiments, the length of the length (LC) of the first arrow and the length (Lq) of the second arrow can be calculated using the following equations. The following equations are referenced to a two-dimensional X-Y coordinate system wherein the Y axis is perpendicular to the curb 20b and the X axis is parallel to the curb. The starting point of the parallel parking maneuver is point A ($x_A$, $y_A$). The end of the first turn is point B ($x_B$, $x_B$). The vehicle steering is then straightened for the parallel parking maneuver between points B ($X_B$, $Y_B$) and E($x_E$, $y_E$) for a distance of L The second turn is performed between points E($x_E$, $y_E$) and F ($x_F$, $y_F$). $Y_{max}$ is the maximum Y value for the host vehicle left front corner W (xw, yw) during the parallel parking maneuver and $X_{max}$ is the maximum distance between the starting location of the rear of the host vehicle and the ending location of the rear of the host vehicle during the parallel parking maneuver. P($X_P$, $Y_P$) is the location of the right front wheel of the host vehicle during the parallel parking maneuver. Q ($x_Q$, $y_Q$) is the location of the right rear corner of the host vehicle during the parallel parking maneuver. $R_1$ is the turn radius of the first turn and $R_2$ is the turn radius of the second turn. $\alpha$ is the angle between the starting points of the first and second turns and the completion points of the first and second turns. $L_e$ is the final distance between the right edge of the host vehicle and the curb 20b. The parallel parking maneuver is described by the following equations in addition to the prior disclosed equation.

$$y_B = y_A + R_1(1 - \cos\alpha)$$

$$x_B = x_A + R_1 \sin\alpha_1$$

$$y_E = y_A + R_1(1 - \cos\alpha) + L \sin\alpha$$

$$x_E = x_A + R_1 \sin\alpha + L \cos\alpha$$

$$y_F = y_E + R_1(1 - \cos\alpha)$$

$$x_F = x_E + R_1 \sin\alpha$$

$$y_w = y_E - b \sin\alpha - (\alpha + l)\cos\alpha$$

Figure 6A:
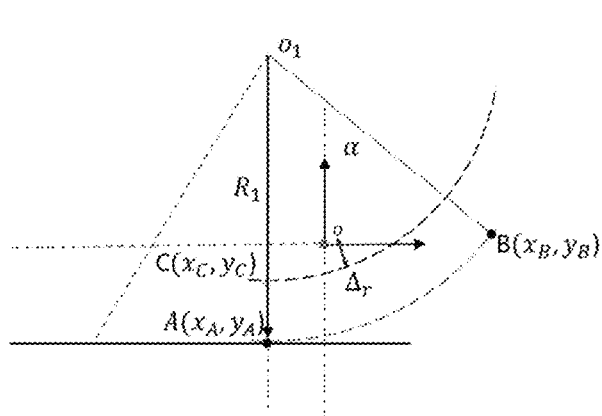
FIG. 6a illustrates a vehicle dynamics model for calculating a rear collision avoidance condition for the driver in the loop parallel parking system in accordance with various embodiments.

Turning now to FIG. 6a, a vehicle dynamics model for calculating a rear collision avoidance condition for the driver in the loop parallel parking system is shown according to an exemplary embodiment. The turn radius of the front right wheel $R_c$ is determined from a first turn origin $O_1$ ($XO_1$, $YO_1$). The chance in radius ($\Delta r$) is determined in response to this turn radius and a deviation from the origin point. The change in turn radius can be limited to less than or equal to a minimum change in radius ($\Delta_{r-min}$). The vehicle dynamics model for rear collision avoidance for the first turn is described by the following equations in addition to the prior disclosed equations.

$$x_{o1} = x_A$$

$$y_{o1} = \sqrt{R_1^2 - x_A^2}$$

$$R_c = \sqrt{(x_c - d_{o1})^2 + (y_c - y_{o1})^2}$$

$$\Delta_r = R_c - \sqrt{x_{01}^2 + y_{01}^2}$$

$$\Delta_r \geq \Delta_{r\text{-}min}$$

Figure 6B:
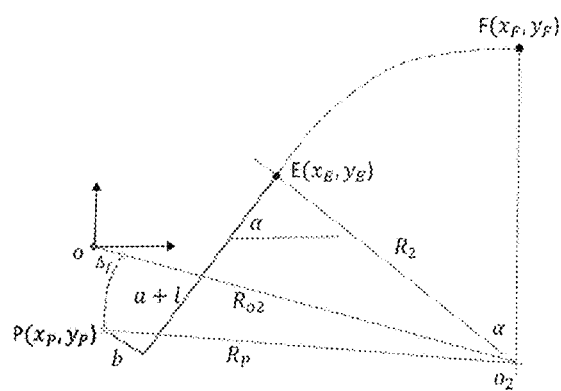
FIG. 6b is illustrative of a vehicle dynamics model for calculating a front collision avoidance condition for the driver in the loop parallel parking system in accordance with various embodiments.

Turning now to FIG. 6b, a vehicle dynamics model for calculating a front collision avoidance condition for the driver in the loop parallel parking system is shown according to an exemplary embodiment. As with the rear collision avoidance condition, the change in turn radius ($\Delta f$) can be limited to less than or equal to a minimum change in radius ($\Delta_{r\text{-}min}$) where the change in turn radius ($\Delta f$) is the difference between the current turn radius ($Ro_2$) and the starting turn radius ($R_P$). The vehicle dynamics model for rear collision avoidance for the first turn is described by the following equations in addition to the prior disclosed equations.

$$x_p = x_\varepsilon - (a+l)\cos \alpha_1 - b \sin \alpha_1$$

$$y_p = y_\varepsilon - (a+l)\sin \alpha_1 + b \cos \alpha_1$$

$$x_{02} = x_\varepsilon + R_2 \sin \alpha_1$$

$$y_{02} = y_E - R_2 \cos \alpha_1$$

$$R_p = \sqrt{(x_p - x_{02})^2 + (y_p - y_{02})^2}$$

$$R_{02} = \sqrt{x_{02}^2 + y_{02}^2}$$

$$\Delta_f = R_{02} - R_p$$

$$\Delta_f \geq \Delta_{f\text{-}min}$$

Figure 6C:
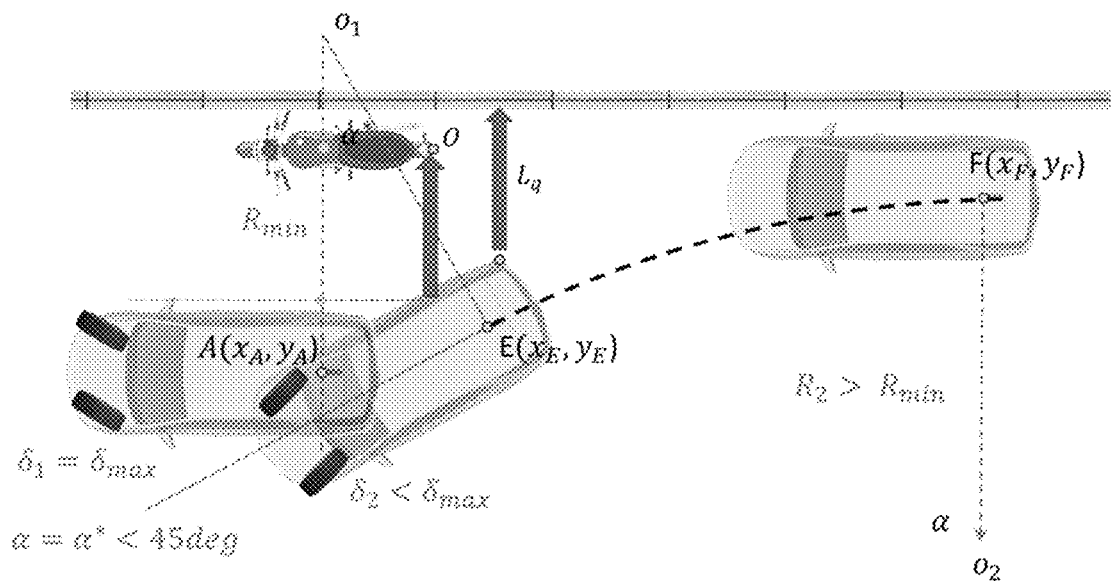
FIG. 6c is illustrative of a vehicle dynamics model for performing the driver in the loop parallel parking method for a close to curb parallel parking case for use against narrow vehicles in accordance with various embodiments.

Turning now to FIG. 6c, a vehicle dynamics model for performing the driver in the loop parallel parking method for a close to curb parallel parking case for use against narrow vehicles, such as motorcycles, is shown according to an exemplary embodiment. The vehicle dynamics model for performing the driver in the loop parallel parking method for a close to curb parallel parking case for use against narrow vehicles is described by the following equation in addition to the prior disclosed equations.

$$\tan \delta_2 = \frac{(1 - \cos\alpha^*)l}{L_q + d \sin \alpha^* + e \cos \alpha^* - L_e - e}$$

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
    a plurality of cameras for capturing a plurality of video streams;
    an image processor for generating an overhead view video stream in response to the plurality of video streams;
    a processor configured for performing a parking assist algorithm including:
        generating an augmented video stream including the overhead view video stream, a graphical representation of a host vehicle, and a first arrow for indicating an initial position of the host vehicle;
        for generating a first control signal indicative of a first steering angle in response to receiving a first confirmation signal from a user interface indicative of a confirmation of the initial position of the host vehicle;
        for generating a second control signal indicative of a second steering angle in response to a change in yaw reaching a first desired yaw;
        generating a second arrow to be overlaid on the overhead view video stream indicative of a distance between the host vehicle and a curb;
        generating a third control signal indicative of a third steering angle in response to receiving a second confirmation signal from the user interface indicative of a confirmation of the distance between the host vehicle and the curb; and
        providing a user feedback indicative of a completion of the parking assist algorithm in response to the change in yaw reaching a second desired yaw.

2. The apparatus of claim 1 wherein the change in yaw is determined against an initial host vehicle yaw established at the initial position of the host vehicle.

3. The apparatus of claim 1 wherein the second desired yaw is zero degrees.

4. The apparatus of claim 1 wherein the first desired yaw is 45 degrees.

5. The apparatus of claim 1 further including a steering controller for adjusting a steering angle of a host vehicle steering mechanism in response to the first control signal, the second control signal and the third control signal.

6. The apparatus of claim 1 wherein the first confirmation signal is generated in response to a host vehicle driver depressing a touch sensitive display at a point where the first arrow is displayed.

7. The apparatus of claim 1 wherein a tip of the first arrow is aligned with a left rear corner of a forward parked vehicle shown on the augmented video stream.

8. The apparatus of claim 1 wherein the processor is further operative for generating a throttle control signal for controlling a reversing of the host vehicle during the parking assist algorithm.

9. The apparatus of claim 1 further configured for suspending the parking assist algorithm in response to receiving a braking indicator indicative of a host vehicle brake pedal being depressed.

10. A method for performing a parking assist algorithm comprising:
    generating, by an image processor, an augmented video stream including an overhead view video stream, a graphical representation of a host vehicle, and a first arrow for indicating an initial position of the host vehicle;
    generating, by a processor, a first control signal indicative of a first steering angle in response to receiving a first confirmation signal from a user interface indicative of a confirmation of the initial position of the host vehicle;
    generating, by the processor, a second control signal indicative of a second steering angle in response to a change in yaw reaching a first desired yaw;
    generating, by the processor, a second arrow to be overlaid on the overhead view video stream indicative of a distance between the host vehicle and a curb;

generating, by the processor, a third control signal indicative of a third steering angle in response to receiving a second confirmation signal from the user interface indicative of a confirmation of the distance between the host vehicle and the curb; and providing, by the processor, a user feedback indicative of a completion of the parking assist algorithm in response to the change in yaw reaching a second desired yaw.

11. The method of claim 10 wherein the overhead view video stream is generated in response to a compilation of a plurality of video streams received from a plurality of vehicle cameras having overlapping fields of views.

12. The method of claim 10 further including controlling a steering controller for adjusting a host vehicle steering angle in response to the first control signal, the second control signal, and the third control signal.

13. The method of claim 10 wherein the second desired yaw is equal to an initial yaw determined at the initial position of the host vehicle.

14. The method of claim 10 wherein the processor is further configured for generating a throttle control signal for controlling a reversing maneuver of the host vehicle during performance of the parking assist algorithm.

15. The method of claim 10 wherein the processor is further configured for suspending the parking assist algorithm in response to receiving a braking indicator indicative of a host vehicle brake pedal being depressed.

16. The method of claim 10 wherein the first confirmation signal is generated in response to a host vehicle driver depressing a touch sensitive display at a point where the first arrow is displayed.

17. The method of claim 10 wherein the second confirmation signal is generated in response to a host vehicle driver depressing a touch sensitive display at a location where the second arrow is displayed.

18. The method of claim 10 wherein the processor is further configured for generating a user steering prompt indicative of a steering angle in response to the first control signal, the second control signal and the third control signal.

19. A vehicle control system comprising:
a vehicle camera system for generating an overhead view video of a host vehicle environment;
an image processor for generating an augmented image including the overhead view video, a graphical representation of a host vehicle, a first arrow and a second arrow;
a display for displaying the augmented image;
a user input for generating a first user confirmation signal in response to a first user input and a second user confirmation signal in response to a second user input;
a processor for:
coupling a request to display the first arrow to the image processor indicative of an initial position of the host vehicle;
generating a first control signal indicative of a first steering angle in response to receiving a first confirmation signal from a user interface indicative of a confirmation of the initial position of the host vehicle;
generating, by the processor, a second control signal indicative of a second steering angle in response to a change in yaw reaching a first desired yaw;
coupling a request to display the second arrow to the image processor indicative of a distance between the host vehicle and a curb;
generating, by the processor, a third control signal indicative of a third steering angle in response to receiving a second confirmation signal from the user interface indicative of a confirmation of the distance between the host vehicle and the curb; and
providing, by the processor, a user feedback indicative of a completion of the parking assist algorithm in response to the change in yaw reaching a second desired yaw.

20. The vehicle control system of claim 19, wherein the user feedback is overlaid on the overhead view video displayed on the display.

* * * * *